US012744939B2

(12) United States Patent
Yu et al.

(10) Patent No.: US 12,744,939 B2
(45) Date of Patent: Sep. 22, 2026

(54) MODEL ADJUSTMENT FOR LOCAL ILLUMINATION COMPENSATION IN VIDEO CODING

(71) Applicant: GUANGDONG OPPO MOBILE TELECOMMUNICATIONS CORP., LTD., Dongguan (CN)

(72) Inventors: Yue Yu, Palo Alto, CA (US); Haoping Yu, Palo Alto, CA (US); Jonathan Gan, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/842,773

(22) PCT Filed: Mar. 3, 2023

(86) PCT No.: PCT/US2023/063711
§ 371 (c)(1),
(2) Date: Aug. 29, 2024

(87) PCT Pub. No.: WO2023/172851
PCT Pub. Date: Sep. 14, 2023

(65) Prior Publication Data
US 2025/0184538 A1 Jun. 5, 2025

Related U.S. Application Data

(60) Provisional application No. 63/269,039, filed on Mar. 8, 2022.

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/139* (2014.11); *H04N 19/154* (2014.11); *H04N 19/176* (2014.11)

(58) Field of Classification Search
CPC .... H04N 19/70; H04N 19/105; H04N 19/139; H04N 19/154; H04N 19/176; H04N 19/136
See application file for complete search history.

(56) References Cited

U.S. PATENT DOCUMENTS

2016/0366415 A1 12/2016 Liu et al.
2020/0162761 A1 5/2020 Andersson
(Continued)

FOREIGN PATENT DOCUMENTS

WO 2020096877 A1 5/2020
WO 2020185491 A1 9/2020

OTHER PUBLICATIONS

International Search Report in the international application No. PCT/US2023/063711, mailed on Jul. 21, 2023, 2 pages.
(Continued)

*Primary Examiner* — Francis Geroleo
(74) *Attorney, Agent, or Firm* — BAYES PLLC

(57) ABSTRACT

A video decoder reconstructs a current frame of a video from a video bitstream based on a reconstructed reference frame. For a block of the current frame, the video decoder identifies a reference block in the reference frame based on a motion vector associated with the block. The decoder determines the slope and offset parameters of a local illumination compensation model based on reconstructed pixels in the current frame and the reference frame. The video decoder decodes, from the video bitstream, an adjustment to the slope and updates the slope by applying the decoded adjustment. The decoder further determines an adjusted offset parameter for the local illumination compensation model. The decoder
(Continued)

generates predicted pixels for the block by at least applying, to the reference block, the local illumination compensation model with the updated parameters.

20 Claims, 8 Drawing Sheets

(51) Int. Cl.
*H04N 19/139* (2014.01)
*H04N 19/154* (2014.01)
*H04N 19/176* (2014.01)

(56) References Cited

U.S. PATENT DOCUMENTS

2020/0344482 A1 10/2020 Zhang
2021/0051345 A1 2/2021 Tsai
2021/0289201 A1 9/2021 Bang
2022/0159290 A1* 5/2022 Bordes ................. H04N 19/182
2023/0224474 A1* 7/2023 Chen .................... H04N 19/105
375/240.02

OTHER PUBLICATIONS

Written Opinion of the International Search Authority in the international application No. PCT/US2023/063711, mailed on Jul. 21, 2023, 19 pages.
B. Bross et al., “Versatile Video Coding Editorial Refinements on Draft 10”, Joint Video Experts Team (JVET) of ITU-T SG 16 WP 3 and ISO/IEC JTC 1/SC 29, 20th Meeting, by teleconference, Oct. 7-16, 2020, Document: JVET-T2001-v2, p. 21-512, 513 pages.
M. Coban et al., “Algorithm description of Enhanced Compression Model 3 (ECM 3)”, Joint Video Experts Team (JVET) of ITU-T SG 16 WP 3 and ISO/IEC JTC 1/SC 29, 23rd Meeting, by teleconference, Jul. 7-16, 2021 Document: JVET-X2025, the whole document, 28 pages.
Supplementary European Search Report in the European application No. 23767577.2, mailed on Feb. 5, 2026.
First Office Action of the Indian application No. 202417074751, issued on May 27, 2026.
First Office Action of the Mexican application No. MX/a/2024/010830, issued on Apr. 24, 2026.

* cited by examiner

CU 402
CU 402
CU 402
CU 402
CU 402
CU 402
CU 402
CU 402
CU 402
CU 402
CU 402
CU 402
CU 402
CU 402

MODEL ADJUSTMENT FOR LOCAL ILLUMINATION COMPENSATION IN VIDEO CODING

CROSS-REFERENCE TO RELATED APPLICATIONS

This application is a national stage application of International Application No. PCT/US2023/063711, filed on Mar. 3, 2023, which claims priority to U.S. Provisional Application No. 63/269,039, entitled "Adjustment of Linear Model for Local Illumination Compensation for Video Coding," filed on Mar. 8, 2022, which is hereby incorporated in its entirety by this reference.

TECHNICAL FIELD

This disclosure relates generally to video processing. Specifically, the present disclosure involves model adjustment for local illumination compensation in video coding.

BACKGROUND

The ubiquitous camera-enabled devices, such as smartphones, tablets, and computers, have made it easier than ever to capture videos or images. However, the amount of data for even a short video can be substantially large. Video coding technology (including video encoding and decoding) allows video data to be compressed into smaller sizes thereby allowing various videos to be stored and transmitted. Video coding has been used in a wide range of applications, such as digital TV broadcast, video transmission over the Internet and mobile networks, real-time applications (e.g., video chat, video conferencing), DVD and Blu-ray discs, and so on. To reduce the storage space for storing a video and/or the network bandwidth consumption for transmitting a video, it is desired to improve the efficiency of the video coding scheme.

SUMMARY

Some embodiments involve model adjustment for local illumination compensation in video coding. In one example, a method for decoding an inter-predicted frame of a video that is encoded with local illumination compensation includes reconstructing one or more frames of the video from a video bitstream representing the video and reconstructing a current frame based on a reference frame from the one or more reconstructed frames. Reconstructing the current frame includes, for a block in the current frame: identifying a reference block in the reference frame based on a motion vector associated with the block; determining a first parameter and a second parameter of a local illumination compensation model based on a first set of reconstructed pixels in the current frame and a second set of reconstructed pixels in the reference frame; decoding, from the video bitstream, a first adjustment to the first parameter; adjusting the first parameter by applying the first adjustment to the first parameter; determining an adjusted second parameter; and reconstructing pixels of the block by applying, to the reference block, the local illumination compensation model with the adjusted first parameter and the adjusted second parameter. The method further includes causing the reconstructed one or more frames and the reconstructed current frame to be displayed.

In another example, a non-transitory computer-readable medium has program code that is stored thereon, the program code executable by one or more processing devices for performing operations. The operations include reconstructing one or more frames of a video from a video bitstream representing the video and reconstructing a current frame based on a reference frame from the one or more reconstructed frames. Reconstructing the current frame includes for a block in the current frame identifying a reference block in the reference frame based on a motion vector associated with the block; determining a first parameter and a second parameter of a local illumination compensation model based on a first set of reconstructed pixels in the current frame and a second set of reconstructed pixels in the reference frame; decoding, from the video bitstream, a first adjustment to the first parameter; adjusting the first parameter by applying the first adjustment to the first parameter; determining an adjusted second parameter; and reconstructing pixels of the block by applying, to the reference block, the local illumination compensation model with the adjusted first parameter and the adjusted second parameter. The operations further include causing the reconstructed one or more frames and the reconstructed current frame to be displayed.

In another example, a system includes a processing device and a non-transitory computer-readable medium communicatively coupled to the processing device. The processing device is configured to execute program code stored in the non-transitory computer-readable medium and thereby perform operations. The operations include reconstructing one or more frames of a video from a video bitstream representing the video and reconstructing a current frame based on a reference frame from the one or more reconstructed frames. Reconstructing the current frame includes for a block in the current frame identifying a reference block in the reference frame based on a motion vector associated with the block; determining a first parameter and a second parameter of a local illumination compensation model based on a first set of reconstructed pixels in the current frame and a second set of reconstructed pixels in the reference frame; decoding, from the video bitstream, a first adjustment to the first parameter; adjusting the first parameter by applying the first adjustment to the first parameter; determining an adjusted second parameter; and reconstructing pixels of the block by applying, to the reference block, the local illumination compensation model with the adjusted first parameter and the adjusted second parameter. The operations further include causing the reconstructed one or more frames and the reconstructed current frame to be displayed.

In yet another example, a method for inter predicting a frame of a video with local illumination compensation includes accessing a plurality of frames of the video and performing inter prediction for a current frame in the plurality of frames. Performing the inter prediction includes, for a block in the current frame, determining a first parameter and a second parameter of a local illumination compensation model based on a first set of reconstructed pixels in the current frame and a second set of reconstructed pixels in a reference frame in the plurality of frames and determining an adjustment to the first parameter based, at least in part, upon the first parameter, the second parameter, original pixels in the block and reconstructed pixels in a reference block in the reference frame, the reference block associated with the block via a motion vector calculated for the block. The method further includes encoding at least the adjustment to the first parameter into a bitstream representing the video.

In another example, a non-transitory computer-readable medium has program code that is stored thereon, the program code executable by one or more processing devices for performing operations. The operations include accessing a plurality of frames of a video and performing inter prediction for a current frame in the plurality of frames. Performing the inter prediction includes, for a block in the current frame, determining a first parameter and a second parameter of a local illumination compensation model based on a first set of reconstructed pixels in the current frame and a second set of reconstructed pixels in a reference frame in the plurality of frames and determining an adjustment to the first parameter based, at least in part, upon the first parameter, the second parameter, original pixels in the block and reconstructed pixels in a reference block in the reference frame, the reference block associated with the block via a motion vector calculated for the block. The operations further include encoding at least the adjustment to the first parameter into a bitstream representing the video.

In another example, a system includes a processing device and a non-transitory computer-readable medium communicatively coupled to the processing device. The processing device is configured to execute program code stored in the non-transitory computer-readable medium and thereby perform operations. The operations include accessing a plurality of frames of a video and performing inter prediction for a current frame in the plurality of frames. Performing the inter prediction includes, for a block in the current frame, determining a first parameter and a second parameter of a local illumination compensation model based on a first set of reconstructed pixels in the current frame and a second set of reconstructed pixels in a reference frame in the plurality of frames and determining an adjustment to the first parameter based, at least in part, upon the first parameter, the second parameter, original pixels in the block and reconstructed pixels in a reference block in the reference frame, the reference block associated with the block via a motion vector calculated for the block. The operations further include encoding at least the adjustment to the first parameter into a bitstream representing the video.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
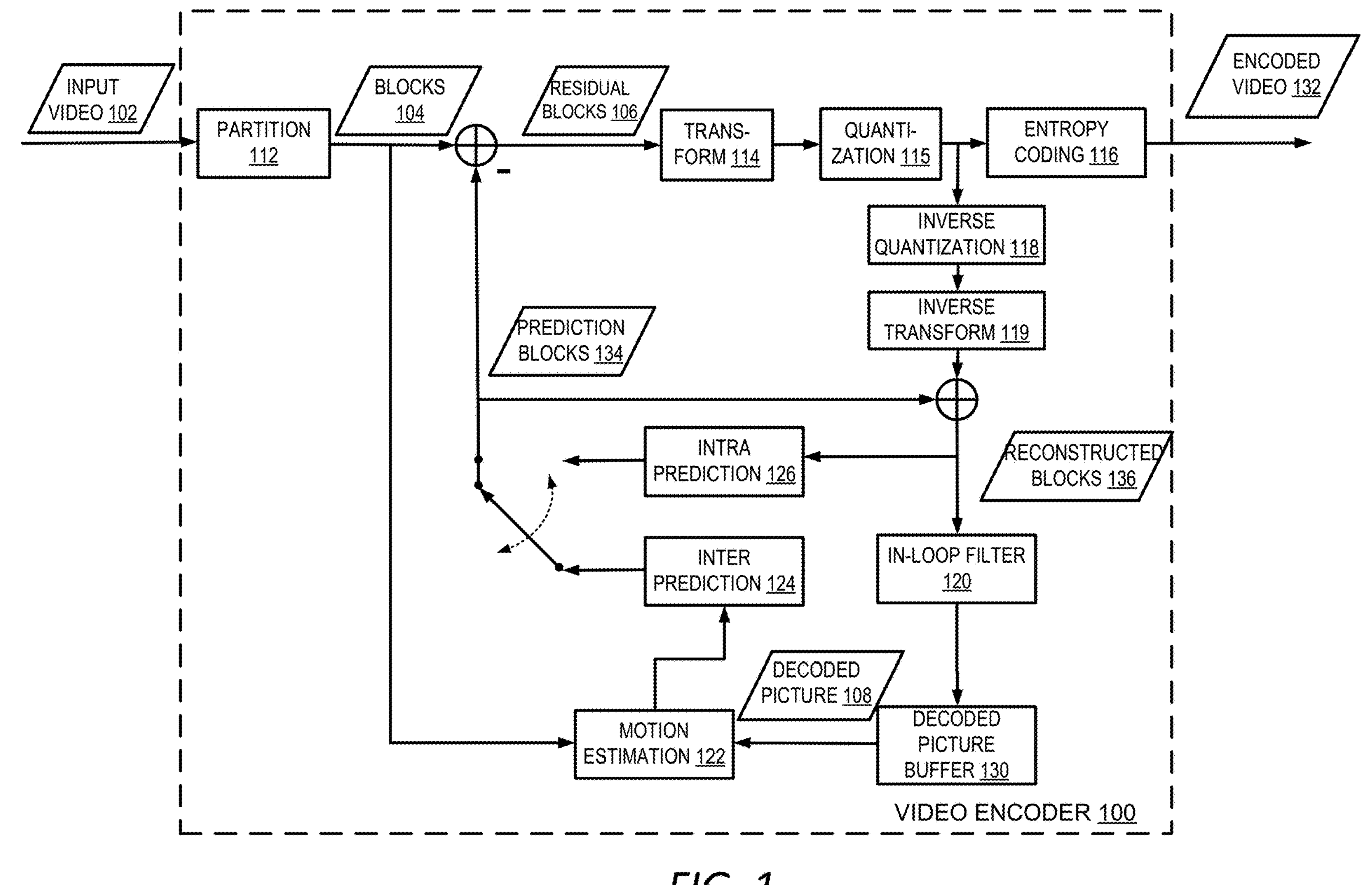
FIG. 1 is a block diagram showing an example of a video encoder configured to implement embodiments presented herein.

Various embodiments provide adjustment of local illumination compensation model for video coding. As discussed above, more and more video data are being generated, stored, and transmitted. It is beneficial to increase the efficiency of the video coding technology. One way to do so is through inter prediction where the prediction of video pixels or samples in a current frame to be decoded uses pixels or samples from other frames which have already been reconstructed. However, there may exist illumination change between the current frame and the reference frames due to light change, such as flashing. Local illumination compensation (LIC) technique is thus used to compensate the illumination change by modeling local illumination variation between the current block and its prediction block as a linear function of the local illumination variation between a current block template (e.g., neighboring pixels of the current block) and a reference block template (e.g., neighboring pixels of the reference block). Because the local illumination compensation model is derived by minimizing a pre-defined error measure with the luma samples from the neighbouring templates, instead of using luma samples from the current block and the reference block, the derived model may be inaccurate, leading to large prediction errors and low coding efficiency.

Various embodiments described herein address these problems by allowing the local illumination compensation model to be determined for a block based on the pixels of the block thereby leading to a more accurate local illumination compensation model. The information about the determined local illumination compensation model can be transmitted in the video bitstream so that the decoder has sufficient information for decoding. For example, a video encoder can be configured to determine the parameters of a base local illumination compensation model for a block based on pixels in the reference frame and the current frame that are available at the decoder when decoding the current block. For example, the encoder can use the reconstructed pixels in the reference frame that neighbor the reference block (referred to as "the reference block template") and pixels in the current frame that neighbor the block (referred to as "the current block template"). The encoder can further determine the updated and more accurate local illumination compensation model by determining adjustments to the parameters of the local illumination compensation model by considering the pixels of the current block and transmit one or more of the adjustments in the video bitstream for the decoder to use at the decoding.

In one embodiment, the local illumination compensation model is a linear model having a slope parameter and an offset parameter. The updated local illumination compensation model is determined by taking into account the pixels of the current block. In order to reduce the data transmitted in the video bitstream, the adjustments to the slope parameter and the offset parameter are constrained to be related through a value derivable without using the pixels in the current block. As such, only the adjustment of the slope parameter needs to be coded into the video bitstream thereby reducing the size of the video bitstream. In one example, the updated local illumination compensation model can be constrained as a linear model intersecting with the base local illumination compensation model at a point having a reference value $\bar{r}$, where $\bar{r}$ is a representative average luma value from the reference frame or the current frame. Through $\bar{r}$, the adjustment to the offset parameter can be determined from the adjustment to the slope parameter using the parameters of the base local illumination compensation model. As a result, there is no need to transmit the adjustment to the offset parameter in the bitstream.

To determine the adjustment to the slope parameter, a set of candidate adjustments can be identified. For each candidate adjustment, the predicted pixels for the block can be determined by applying the updated local illumination compensation model with the corresponding adjustment. A distortion value can be determined between the predicted pixels and the original pixels in the current block. The candidate adjustment that leads to the smallest distortion can be selected as the adjustment to the slope parameter and encoded into the video bitstream.

In another embodiment, there are no constraints imposed on the updated local illumination compensation model and both adjustments to the slope and offset parameters can be transmitted in the video bitstream to achieve a more accurate local illumination compensation model. As such, the updated local illumination compensation model can be determined using any method available at the encoder. For example, the decoder can derive the parameters of the updated local illumination compensation model using the pixels in the current block and reconstructed pixels in the reference block. The differences between the derived parameters and the parameters of the base model can be encoded into the video bitstream as the adjustments to the parameters of the local illumination compensation model.

At the decoding side, a video decoder can determine the slope and offset parameters of a base local illumination compensation model based on reconstructed pixels in the current frame and the reference frame in the same way as the encoder. The video decoder can further decode, from the video bitstream, the adjustment to the local illumination compensation model. If only the slope parameter adjustment is encoded in the bitstream, the decoder decodes the slope adjustment and derive the offset adjustment or the updated offset based on the slope adjustment and a same reference value $\bar{r}$ described before, and the parameters of the base local illumination compensation model is then updated with decoded slope adjustment and calculated offset adjustment. If both the slope adjustment and the offset adjustment are encoded in the video bitstream, the decoder decodes both adjustments from the bitstream. The decoder updates the based local illumination compensation model with the obtained slope and offset adjustments and apply the updated local illumination compensation model to the reconstructs pixels in the reference block to generate reconstructed pixels for the current block in the current frame.

As described herein, some embodiments provide improvements in video coding efficiency through adjusting the local illumination compensation model by taking into account the pixels of the current block. Because the local illumination compensation model for the block is derived based on the pixels of the current block, rather than the neighboring pixel, the illumination compensation is more accurate, and the reconstructed block has lower prediction errors. As a result, the video coding efficiency can be improved. The techniques can be an effective coding tool in future video coding standards.

Referring now to the drawings, FIG. 1 is a block diagram showing an example of a video encoder 100 configured to implement embodiments presented herein. In the example shown in FIG. 1, the video encoder 100 includes a partition module 112, a transform module 114, a quantization module 115, an inverse quantization module 118, an inverse transform module 119, an in-loop filter module 120, an intra prediction module 126, an inter prediction module 124, a motion estimation module 122, a decoded picture buffer 130, and an entropy coding module 116.

The input to the video encoder 100 is an input video 102 containing a sequence of pictures (also referred to as frames or images). In a block-based video encoder, for each of the pictures, the video encoder 100 employs a partition module 112 to partition the picture into blocks 104, and each block contains multiple pixels. The blocks may be macroblocks, coding tree units, coding units, prediction units, and/or prediction blocks. One picture may include blocks of different sizes and the block partitions of different pictures of the video may also differ. Each block may be encoded using different predictions, such as intra prediction or inter prediction or intra and inter hybrid prediction.

Usually, the first picture of a video signal is an intra-coded picture, which is encoded using only intra prediction. In the intra prediction mode, a block of a picture is predicted using only data that has been encoded from the same picture. A picture that is intra-coded can be decoded without information from other pictures. To perform the intra-prediction, the video encoder 100 shown in FIG. 1 can employ the intra prediction module 126. The intra prediction module 126 is configured to use reconstructed samples in reconstructed blocks 136 of neighboring blocks of the same picture to generate an intra-prediction block (the prediction block 134). The intra prediction is performed according to an intra-prediction mode selected for the block. The video encoder 100 then calculates the difference between block 104 and the intra-prediction block 134. This difference is referred to as residual block 106.

To further remove the redundancy from the block, the residual block 106 is transformed by the transform module 114 into a transform domain by applying a transform on the samples in the block. Examples of the transform may include, but are not limited to, a discrete cosine transform (DCT) or discrete sine transform (DST). The transformed values may be referred to as transform coefficients representing the residual block in the transform domain. In some examples, the residual block may be quantized directly without being transformed by the transform module 114. This is referred to as a transform skip mode.

The video encoder 100 can further use the quantization module 115 to quantize the transform coefficients to obtain quantized coefficients. Quantization includes dividing a sample by a quantization step size followed by subsequent rounding, whereas inverse quantization involves multiplying the quantized value by the quantization step size. Such a quantization process is referred to as scalar quantization. Quantization is used to reduce the dynamic range of video samples (transformed or non-transformed) so that fewer bits are used to represent the video samples.

The quantization of coefficients/samples within a block can be done independently and this kind of quantization method is used in some existing video compression standards, such as H.264, and HEVC. For an N-by-M block, some scan order may be used to convert the 2D coefficients of a block into a 1-D array for coefficient quantization and coding. Quantization of a coefficient within a block may make use of the scan order information. For example, the quantization of a given coefficient in the block may depend on the status of the previous quantized value along the scan order. In order to further improve the coding efficiency, more than one quantizer may be used. Which quantizer is used for quantizing a current coefficient depends on the information preceding the current coefficient in the encoding/decoding scan order. Such a quantization approach is referred to as dependent quantization.

The degree of quantization may be adjusted using the quantization step sizes. For instance, for scalar quantization, different quantization step sizes may be applied to achieve finer or coarser quantization. Smaller quantization step sizes correspond to finer quantization, whereas larger quantization step sizes correspond to coarser quantization. The quantization step size can be indicated by a quantization parameter (QP). Quantization parameters are provided in an encoded bitstream of the video such that the video decoder can access and apply the quantization parameters for decoding.

The quantized samples are then coded by the entropy coding module 116 to further reduce the size of the video signal. The entropy encoding module 116 is configured to apply an entropy encoding algorithm to the quantized samples. In some examples, the quantized samples are binarized into binary bins and coding algorithms further compress the binary bins into bits. Examples of the binarization methods include, but are not limited to, a combined truncated Rice (TR) and limited k-th order Exp-Golomb (EGk) binarization, and k-th order Exp-Golomb binarization. Examples of the entropy encoding algorithm include, but are not limited to, a variable length coding (VLC) scheme, a context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding, or other entropy encoding techniques. The entropy-coded data is added to the bitstream of the output encoded video 132.

As discussed above, reconstructed blocks 136 from neighboring blocks are used in the intra-prediction of blocks of a picture. Generating the reconstructed block 136 of a block involves calculating the reconstructed residuals of this block. The reconstructed residual can be determined by applying inverse quantization and inverse transform to the quantized residual of the block. The inverse quantization module 118 is configured to apply the inverse quantization to the quantized samples to obtain de-quantized coefficients. The inverse quantization module 118 applies the inverse of the quantization scheme applied by the quantization module 115 by using the same quantization step size as the quantization module 115. The inverse transform module 119 is configured to apply the inverse transform of the transform applied by the transform module 114 to the de-quantized samples, such as inverse DCT or inverse DST. The output of the inverse transform module 119 is the reconstructed residuals for the block in the pixel domain. The reconstructed residuals can be added to the prediction block 134 of the block to obtain a reconstructed block 136 in the pixel domain. For blocks where the transform is skipped, the inverse transform module 119 is not applied to those blocks. The de-quantized samples are the reconstructed residuals for the blocks.

Blocks in subsequent pictures following the first intra-predicted picture can be coded using either inter prediction or intra prediction. In inter-prediction, the prediction of a block in a picture is from one or more previously encoded video pictures. To perform inter prediction, the video encoder 100 uses an inter prediction module 124. The inter prediction module 124 is configured to perform motion compensation for a block based on the motion estimation provided by the motion estimation module 122.

The motion estimation module 122 compares a current block 104 of the current picture with decoded reference pictures 108 for motion estimation. The decoded reference pictures 108 are stored in a decoded picture buffer 130. The motion estimation module 122 selects a reference block from the decoded reference pictures 108 that best matches the current block. The motion estimation module 122 further identifies an offset between the position (e.g., x, y coordinates) of the reference block and the position of the current block. This offset is referred to as the motion vector (MV) and is provided to the inter prediction module 124 along with the selected reference block. In some cases, multiple reference blocks are identified for the current block in multiple decoded reference pictures 108. Therefore, multiple motion vectors are generated and provided to the inter prediction module 124 along with the corresponding reference blocks.

The inter prediction module 124 uses the motion vector(s) along with other inter-prediction parameters to perform motion compensation to generate a prediction of the current block, i.e., the inter prediction block 134. For example, based on the motion vector(s), the inter prediction module 124 can locate the prediction block(s) pointed to by the motion vector(s) in the corresponding reference picture(s). If there is more than one prediction block, these prediction blocks are combined with some weights to generate a prediction block 134 for the current block.

For inter-predicted blocks, the video encoder 100 can subtract the inter-prediction block 134 from block 104 to generate the residual block 106. The residual block 106 can be transformed, quantized, and entropy coded in the same way as the residuals of an intra-predicted block discussed above. Likewise, the reconstructed block 136 of an inter-predicted block can be obtained through inverse quantizing, inverse transforming the residual, and subsequently combining with the corresponding prediction block 134.

To obtain the decoded picture 108 used for motion estimation, the reconstructed block 136 is processed by an in-loop filter module 120. The in-loop filter module 120 is configured to smooth out pixel transitions thereby improving the video quality. The in-loop filter module 120 may be configured to implement one or more in-loop filters, such as a de-blocking filter, a sample-adaptive offset (SAO) filter, an adaptive loop filter (ALF), etc.

Figure 2:
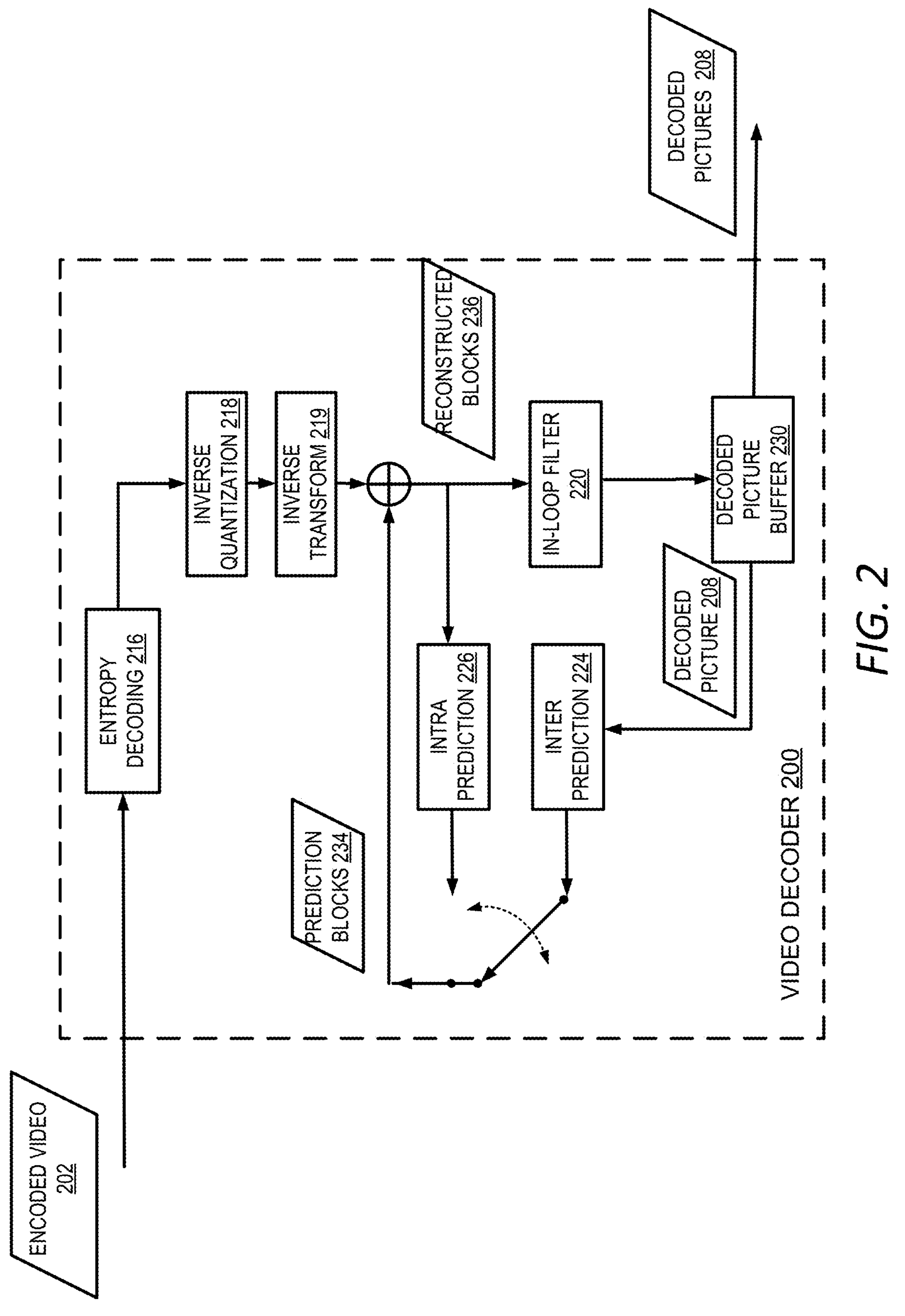
FIG. 2 is a block diagram showing an example of a video decoder configured to implement embodiments presented herein.

FIG. 2 depicts an example of a video decoder 200 configured to implement the embodiments presented herein. The video decoder 200 processes an encoded video 202 in a bitstream and generates decoded pictures 208. In the example shown in FIG. 2, the video decoder 200 includes an entropy decoding module 216, an inverse quantization module 218, an inverse transform module 219, an in-loop filter module 220, an intra prediction module 226, an inter prediction module 224, and a decoded picture buffer 230.

The entropy decoding module 216 is configured to perform entropy decoding of the encoded video 202. The entropy decoding module 216 decodes the quantized coefficients, coding parameters including intra prediction parameters and inter prediction parameters, and other information. In some examples, the entropy decoding module 216 decodes the bitstream of the encoded video 202 to binary representations and then converts the binary representations to quantization levels of the coefficients. The entropy-decoded coefficient levels are then inverse quantized by the inverse quantization module 218 and subsequently inverse transformed by the inverse transform module 219 to the pixel domain. The inverse quantization module 218 and the inverse transform module 219 function similarly to the inverse quantization module 118 and the inverse transform module 119, respectively, as described above with respect to FIG. 1. The inverse-transformed residual block can be added to the corresponding prediction block 234 to generate a reconstructed block 236. For blocks where the transform is skipped, the inverse transform module 219 is not applied to those blocks. The de-quantized samples generated by the inverse quantization module 118 are used to generate the reconstructed block 236.

The prediction block 234 of a particular block is generated based on the prediction mode of the block. If the coding parameters of the block indicate that the block is intra predicted, the reconstructed block 236 of a reference block in the same picture can be fed into the intra prediction module 226 to generate the prediction block 234 for the block. If the coding parameters of the block indicate that the block is inter-predicted, the prediction block 234 is generated by the inter prediction module 224. The intra prediction module 226 and the inter prediction module 224 function similarly to the intra prediction module 126 and the inter prediction module 124 of FIG. 1, respectively.

As discussed above with respect to FIG. 1, the inter prediction involves one or more reference pictures. The video decoder 200 generates the decoded pictures 208 for the reference pictures by applying the in-loop filter module 220 to the reconstructed blocks of the reference pictures. The decoded pictures 208 are stored in the decoded picture buffer 230 for use by the inter prediction module 224 and also for output.

Figures 3, 4:
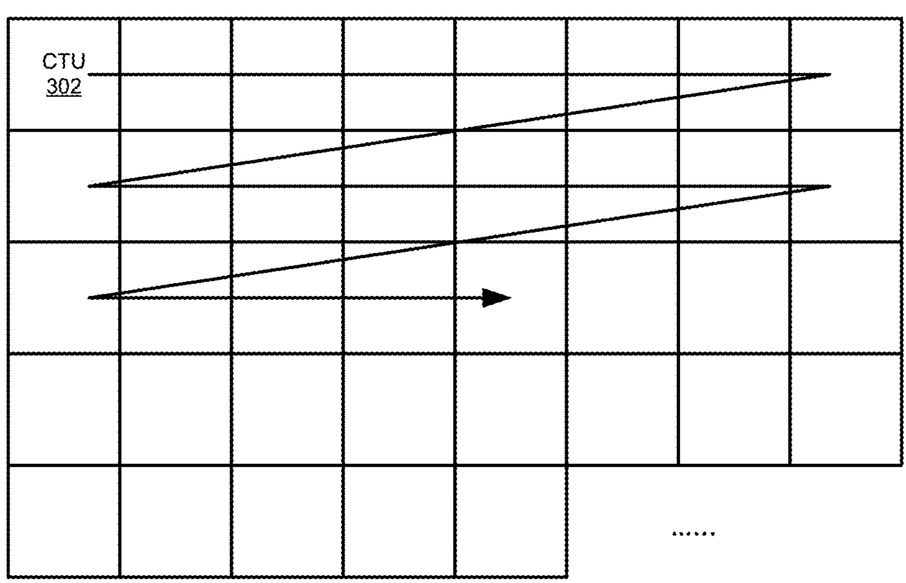
FIG. 3 depicts an example of a coding tree unit division of a picture in a video, according to some embodiments of the present disclosure.
FIG. 4 depicts an example of a coding unit division of a coding tree unit, according to some embodiments of the present disclosure.

Referring now to FIG. 3, FIG. 3 depicts an example of a coding tree unit division of a picture in a video, according to some embodiments of the present disclosure. As discussed above with respect to FIGS. 1 and 2, to encode a picture of a video, the picture is divided into blocks, such as the CTUs (Coding Tree Units) 302 in VVC, as shown in FIG. 3. For example, the CTUs 302 can be blocks of 128×128 pixels. The CTUs are processed according to an order, such as the order shown in FIG. 3. In some examples, each CTU 302 in a picture can be partitioned into one or more CUs (Coding Units) 402 as shown in FIG. 4, which can be further partitioned into prediction units or transform units (TUs) for prediction and transformation. Depending on the coding schemes, a CTU 302 may be partitioned into CUs 402 differently. For example, in VVC, the CUs 402 can be rectangular or square, and can be coded without further partitioning into prediction units or transform units. Each CU 402 can be as large as its root CTU 302 or be subdivisions of a root CTU 302 as small as 4×4 blocks. As shown in FIG. 4, a division of a CTU 302 into CUs 402 in VVC can be quadtree splitting or binary tree splitting or ternary tree splitting. In FIG. 4, solid lines indicate quadtree splitting and dashed lines indicate binary or ternary tree splitting.

Local Illumination Compensation

A general tool employed in the hybrid video coding system of VVC, HEVC, and many other practical video coding standards, is the prediction of video pixels or samples in a current frame to be decoded using pixels or samples from other frames which have already been reconstructed. Coding tools following this general architecture are commonly referred to as "inter-prediction" tools, and the reconstructed frames may be called "reference frames." For stationary video scenes, inter-prediction for the pixels or samples in the current frame can be achieved by using the collocated pixels or samples from the reference frames. However, video scenes containing motion necessitate the use of inter-prediction tools with motion compensation. For example, a "current block" of samples in the current frame may be predicted from a "prediction block" or "reference block" of samples from a reference frame, which is determined by firstly decoding a "motion vector" that signals the position of the prediction block in the reference frame relative to the position of the current block in the current frame. More sophisticated inter-prediction tools are used to exploit video scenes with complex motion, such as occlusion, or affine motion.

Figure 5:
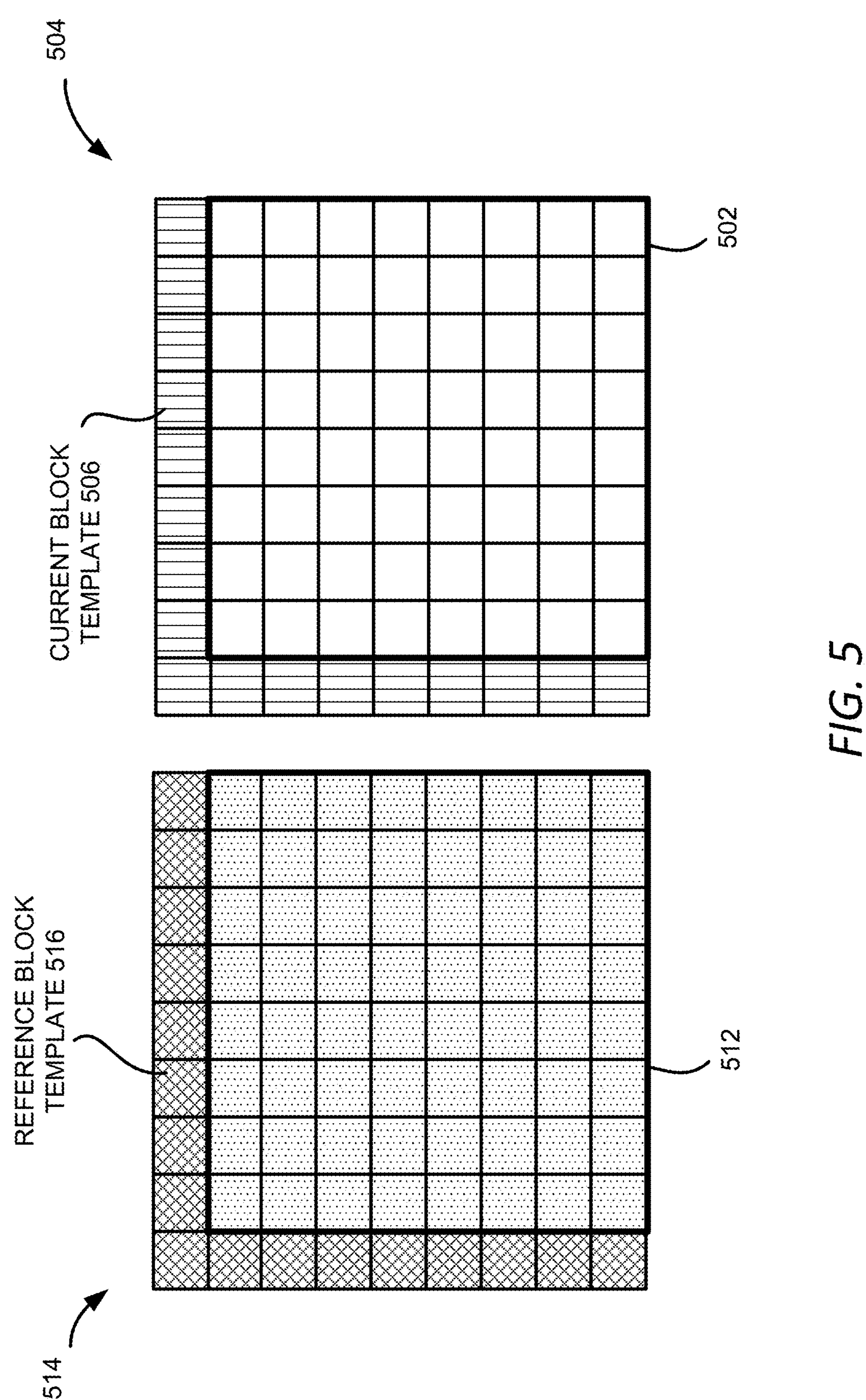
FIG. 5 depicts an example of the pixels involved in the local illumination compensation, according to some embodiments of the present disclosure.

However, there may exist illumination change between the current picture and its reference pictures due to light change, e.g., flashing. Traditional motion compensation, including affine based motion compensation, cannot capture and process such light change effectively for coding. Local illumination compensation (LIC) is an inter prediction technique to model local illumination variation between the current block and its reference block as a linear function of the local illumination variation between a current block template and a reference block template. FIG. 5 depicts an example of the pixels involved in the local illumination compensation, according to some embodiments of the present disclosure. For an M×N current block 502 in a current frame 504, a reference block 512 of the same size is determined from a reference frame 514 containing reconstructed pixels using transmitted or derived side information such as reference frame indices, motion model mode selection, and motion vectors. A current block template 506 is determined from the reconstructed pixels in a neighbourhood around the current block 502. Similarly, a reference block template 516 is determined from the collocated pixels in a neighbourhood around the reference block 512. In FIG. 5, the pixels in the current block 502 are represented with blank squares and the neighboring reconstructed/decoded pixels in the current block template 506 are represented using squares filled with vertical lines. Based upon the known motion information, the reference block 512 for the current block 502 is determined and represented in dotted squares in the reference frame 514. In some examples, the reference block 512 is at the integer pixel position. If the motion vector for the current block points to a sub-pixel location, the nearest inter-pixel block in the reference frame is determined as the reference block. The reference block template 516 in the reference frame 514 containing the neighboring reconstructed/decoded pixels of the reference block 512 has the same shape as the current block template 506 and is shown as squares filled with crossed lines.

The reference block template 516 in the reference frame 514 and the current block template 506 in the current frame 504 can be used to model a function to reflect the local illumination change for the current block. In some examples, a linear function with a slope parameter α and an offset parameter β is used to model such relationship. More specifically, predicted luma samples p[x] for the current block are calculated as follows:

$$p[x] = \alpha * r[x] + \beta \tag{1}$$

where r[x] is a luma sample pointed to by the motion vector at a location x in the reference frame 514, and p[x] is a luma prediction sample produced by applying the local illumination compensation model. The model parameters α and β are derived by fitting the local illumination compensation model to the luma samples in the current block template 506 and the reference block template 516. For example, the local illumination compensation model may be fitted by the least mean square (LMS) or similar method. Since the current block template 506 and reference block template 516 are both reconstructed and available to the decoder at the point of decoding the current block, the model parameters can be determined implicitly, and no signaling overhead is required for α and β. However, an LIC flag may be signaled for LIC mode to indicate the usage of LIC.

As discussed above, because the local illumination compensation model is derived by minimizing a pre-defined error measure with the luma samples from the neighbouring templates, the model may not be optimal for predicting luma samples of the current block. Despite the spatial closeness of the neighbouring template to the current block, the optimality of the model cannot be guaranteed. For example, samples from the neighbouring template and the current block may be from different objects in the video scene, with different illumination characteristics, and so on. To solve these problems, the local illumination compensation model can be adjusted or updated by considering the pixels in the current block thereby improving the accuracy of the model.

In one embodiment, an adjustment to the parameters of the local illumination compensation model is signaled in the bitstream and can be used to adjust the local illumination compensation model derived from neighboring template as described in the above (referred to as "base local illumination compensation model" or "base model"). In order to reduce the data transmitted in the video bitstream, the adjustments to the slope parameter and the offset parameter of the model are constrained to be related through a value derivable without using the pixels in the current block. As such, only the adjustment of the slope parameter needs to be coded into the video bitstream thereby reducing the size of the video bitstream. In one example, the updated local illumination compensation model can be constrained as a linear model intersecting with the base local illumination compensation model at a reference point $\bar{r}$ where $\bar{r}$ is a representative average luma value from the reference frame or the current frame. Through $\bar{r}$, the adjustment to the offset parameter or the adjusted offset parameter can be determined from the adjustment to the slope parameter using the parameters of the base local illumination compensation model. As a result, there is no need to transmit the adjustment to the offset parameter in the bitstream.

Figure 6:
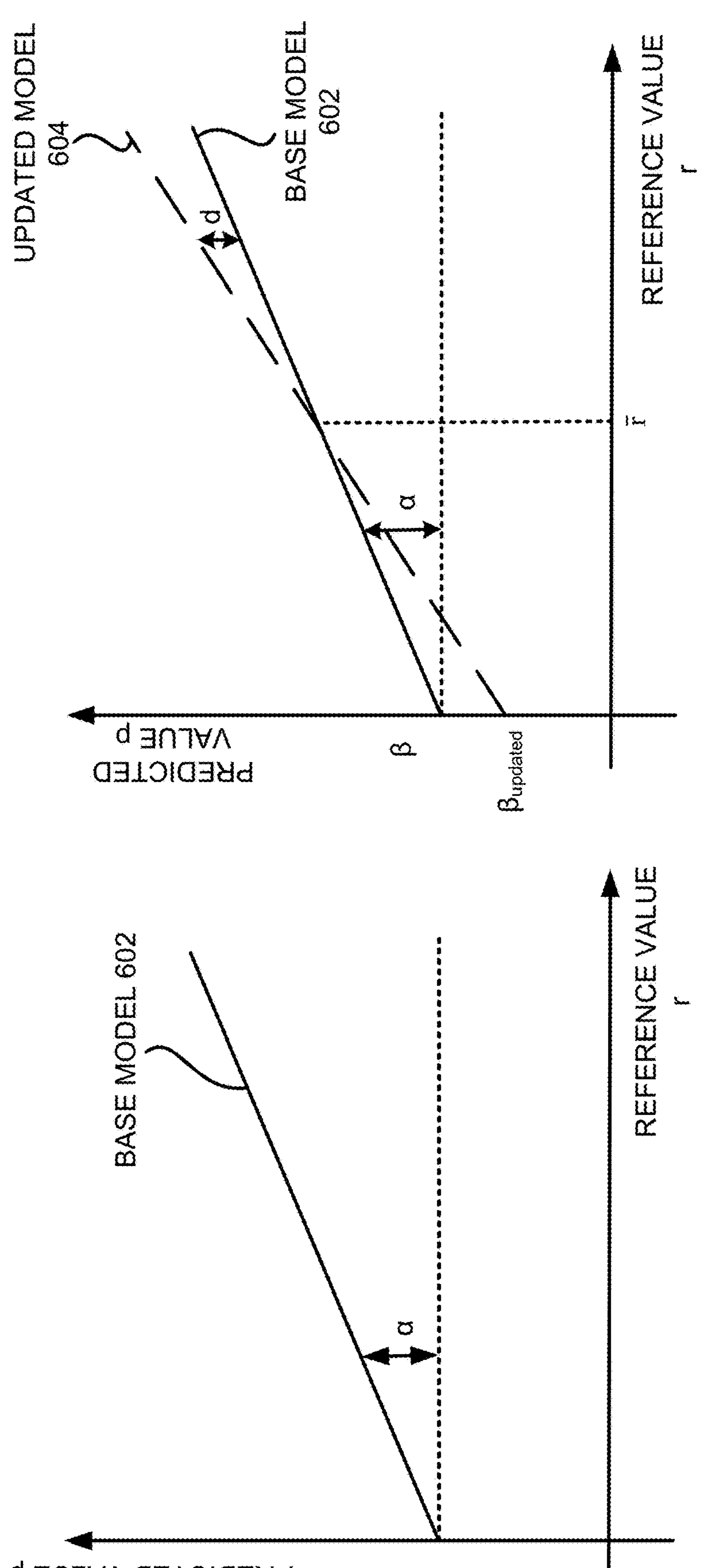
FIG. 6 depicts an example of a linear model for local illumination compensation and the model adjustment, according to some embodiments of the present disclosure.

FIG. 6 depicts an example of a linear model for local illumination compensation and the model adjustment, according to some embodiments of the present disclosure. The base local illumination compensation model 602 is shown on the left side of FIG. 6 and the updated local illumination compensation model 604 with parameter adjustments is shown on the right side of FIG. 6 along with the base model 602. In FIG. 6, the base model 602 is shown as a solid line and the updated model 604 is shown as a dashed line. The base model 602 and the updated model 604 intersect at a point which has the reference value $\bar{r}$. In some examples, $\bar{r}$ is a representative average luma value from the reference frame or the current frame which can be obtained at both encoding and decoding processes. For example, $\bar{r}$ may be the average value of the reconstructed pixels in the reference block template 516 in the example shown in FIG. 5. Alternatively, $\bar{r}$ may be the average value of reconstructed pixels of the reference block 512 in the example shown in FIG. 5. In another example, $\bar{r}$ may be the average value of the reconstructed pixels in the current block template 506 in the example shown in FIG. 5.

Compared with the base model 602, the updated model 604 may have both the slope parameter α and the offset parameter β adjusted. The adjustment to the slope, denoted as d, can be signaled in the bitstream and can be used to adjust the base local illumination compensation model at the decoder. The updated slope $\alpha_{updated}$ can be calculated as:

$$\alpha_{updated} = \alpha + d \tag{2}$$

where α is the slope derived for the base model. The updated offset $\beta_{updated}$ can be calculated as:

$$\beta_{updated} = \beta - \alpha_{updated} \times \bar{r} \tag{3}$$

where β is the offset derived for the base model. In some examples, the slope adjustment d can be normalized as an integer number and be coded in the bitstream.

To find the slope adjustment for the local illumination compensation model, the video encoder can select a set of candidate slope adjustments $D=\{d_1, d_2, \ldots, d_T\}$. In some examples, each candidate slope adjustment $d_i$ is an integer and D includes the values near 0, such as {−3, −2, −1, 0, 1, 2, 3}. For a given candidate slope adjustment $d_i$, the updated slope and offset will be calculated according to Eqns. (2) and (3). The encoder can use the updated local illumination compensation model to calculate the predicted values for the current block using Eqn. (1). Because the encoder has access to the current block, a distortion between the prediction values and the original pixels in the current block can be calculated. The candidate slope adjustment associated with the minimum distortion will be selected as the final slope adjustment d for the current block and therefore be coded in the bitstream. In some examples, the distortion can be the sum of absolute transform distortion (SATD). The SATD can be calculated as the sum of the absolute of transformed sample-wise differences between the current block and the prediction values. The transformation can be any type of transformation applied on the current block and the predicted block, such as the Hadamard transform. Other types of distortions can also be utilized, such as the mean squared error (MSE), the sum of absolute differences (SAD), and so on.

In order to efficiently code the slope adjustment, a flag abs_delta_slope_greater0_flag can be first coded to indicate if the absolute value of the slope adjustment is equal to 0. If abs_delta_slope_greater0_flag is not zero, abs_delta_slope_greater1_flag is coded to indicate if the absolute value of the slope adjustment is greater than 1 or not. If abs_delta_slope_greater1_flag is greater than 1, the syntax element abs_delta_slope_minus2 can be coded to indicate the absolute value of the slope adjustment minus 2. In addition, if the absolute value of the slope adjustment is not zero, delta_slope_sign_flag can be coded to indicate the slope adjustment is positive or negative. A possible syntax representation is shown below in Table 1.

TABLE 1

| Syntax representation for coding delta scale | Descriptor |
|---|---|
| delta_scale_coding( ) { | |
| abs_delta_slope_greater0_flag | ae(v) |
| if( abs_delta_slope_greater0_flag ) | |
| abs_delta_slope_greater1_flag | ae(v) |
| if( abs_delta_slope_greater0_flag ) { | |
| if( abs_delta_slope_greater1_flag ) | |
| abs_delta_slope_minus2 | ae(v) |
| delta_slope_sign_flag | ae(v) |
| } | |
| } | |

In another embodiment, both the slope adjustment and the offset adjustment may be encoded into the video bitstream and decoded at the decoder side to adjust the base model for local illumination compensation. Denoting the slope adjustment and offset adjustment as $d_s$ and $d_o$, respectively, the updated slope $\alpha_{updated}$ and offset $\beta_{updated}$ can be calculated as:

$$\alpha_{updated} = \alpha + d_s \tag{4}$$

$$\beta_{updated} = \beta + d_o \tag{5}$$

The $\alpha_{updated}$ and $\beta_{updated}$ can be used as the parameters of the local illumination compensation model instead of the derived $\alpha$ and $\beta$ for the base model. Both $\alpha_{updated}$ and $\beta_{updated}$ could be coded in a similar fashion as shown in Table 1.

Because both the slope adjustment and the offset adjustment are transmitted in the video bitstream, there is no need to impose the constraints on the updated local illumination compensation model. As such, the adjustments to the slope and offset parameters (or equivalently, the updated local illumination compensation model) can be determined using any method available at the decoder that leads to a more accurate local illumination compensation model. For example, the decoder can derive the parameters of the updated local illumination compensation model using the pixels in the current block and reconstructed pixels in the reference block. The differences between the derived parameters and the parameters of the base model can be encoded into the video bitstream as the adjustments to the parameters of the local illumination compensation model.

In the embodiments described above, the use of the encoded parameter adjustment(s) may be signaled at different levels in the bitstream and be enabled or disabled. For example, at the sequence parameter set (SPS) level, the signaling can be added as follows (additions are shown as underlined):

| | Descriptor |
|---|---|
| seq_parameter_set_rbsp( ) { | |
| sps_seq_parameter_set_id | u(4) |
| ...... | |
| sps_lic_delta_flag | u(1) |
| ...... | |
| ...... | |
| ...... | |
| } | |

sps_lic_delta_flag equal to 1 specifies that the delta based LIC is enabled for the coded layer video sequence (CLVS). sps_lic_delta_flag equal to 0 specifies that the delta based LIC is disabled for the CLVS.

| | Descriptor |
|---|---|
| pic_parameter_set_rbsp( ) { | |
| pps_pic_parameter_set_id | u(6) |
| ...... | |
| if(sps_lic_delta_flag) | |
| pps_lic_delta_flag | u(1) |
| ...... | |
| } | |

pps_lic_delta_flag equal to 1 specifies that the delta based LIC is enabled for the current picture. pps_lic_delta_flag equal to 0 specifies that the delta based LIC is disabled for the current picture. When not present, the value of pps_lic_delta_flag is inferred to be equal to 0.

| | Descriptor |
|---|---|
| slice_header( ) { | |
| sh_picture_header_in_slice_header_flag | u(1) |
| ...... | |
| if(pps_lic_delta_flag ) | |
| sh_lic_delta_flag | u(1) |
| ...... | |
| } | |

sh_lic_delta_flag equal to 1 specifies that the delta based LIC is enabled for the current slice. sh_lic_delta_flag equal to 0 specifies that the delta based LIC is disabled for the current slice. When not present, the value of sh_lic_delta_flag is inferred to be equal to 0.

Figure 7:
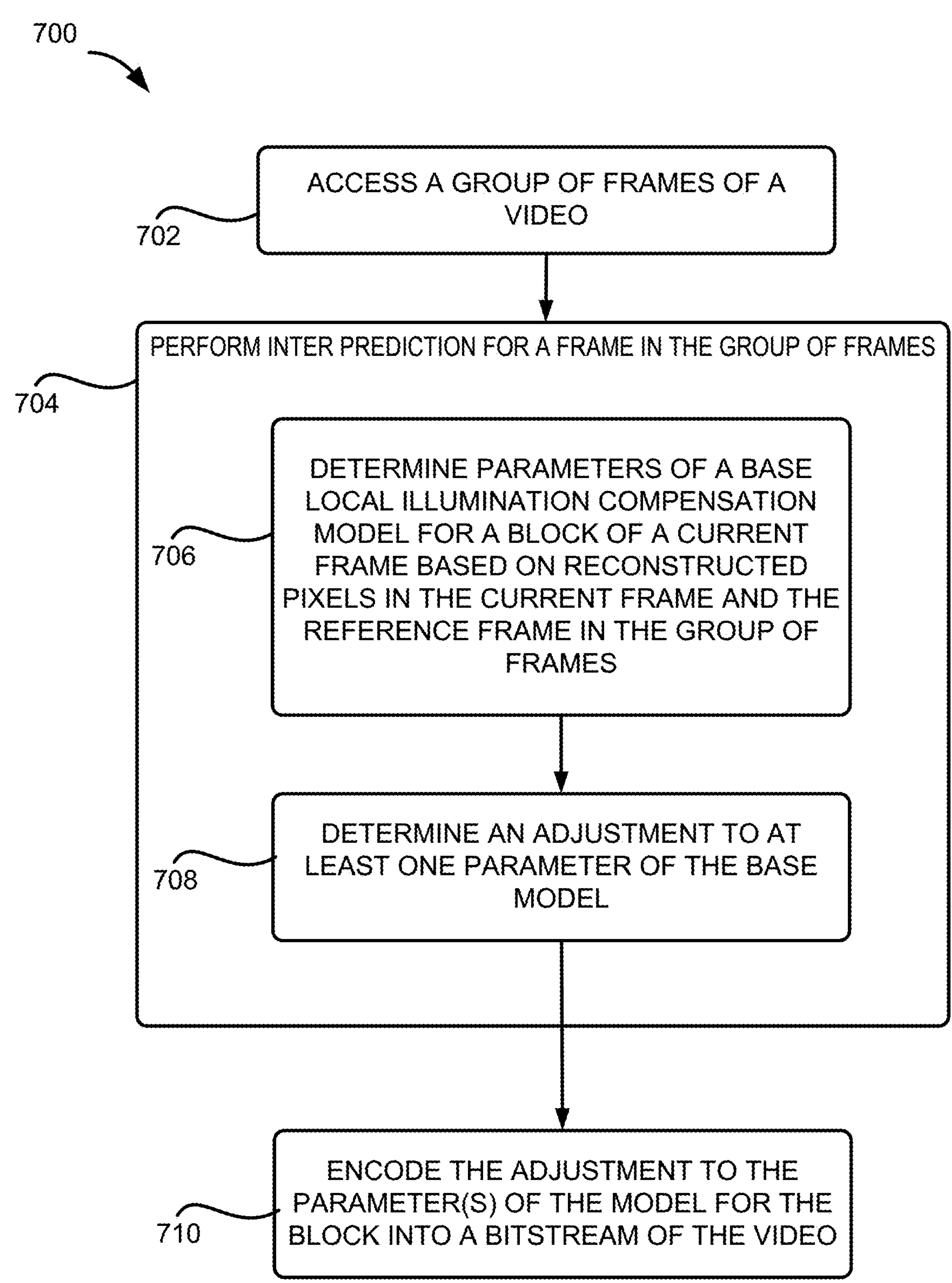
FIG. 7 depicts another example of a process for performing inter prediction for a frame of a video with local illumination compensation, according to some embodiments of the present disclosure.

FIG. 7 depicts an example of a process 700 for performing the inter prediction for a frame of a video with local illumination compensation, according to some embodiments of the present disclosure. One or more computing devices (e.g., the computing device implementing the video encoder 100) implement operations depicted in FIG. 7 by executing suitable program code (e.g., the program code implementing the inter prediction module 124). For illustrative purposes, the process 700 is described with reference to some examples depicted in the figures. Other implementations, however, are possible.

At block 702, the process 700 involves accessing a group of frames of a video signal. Each of the group of frames can be divided into blocks. A block can be a portion of a frame, such as a coding unit 402 discussed in FIG. 4 or any type of block processed by a video encoder as a unit when performing the encoding. In some examples, the group of frames include at least one frame that has been encoded and reconstructed and a frame to be encoded through inter prediction using the reconstructed frame as a reference frame.

At block 704, which includes blocks 706 and 708, the process 700 involves performing inter prediction for the frame in the group of frames. At block 706, the process 700 involves determining parameters of a base local illumination compensation model for a block of the frame based on reconstructed pixels in the frame and the reference frame. For example, as discussed above in detail with respect to FIG. 5, the parameters of a base local illumination compensation model can be determined via the least mean square (LMS) or similar method using the luma samples in the current block template 506 and the reference block template 516.

At block 708, the process 700 involves determining an adjustment to the parameters of the local illumination compensation model. As discussed above, the encoder can determine the adjustment for the slope parameter and derive the adjustment for the offset parameter or the adjusted offset parameter using the method described with regard to FIG. 6. Alternatively, the encoder can use any method that leads to a more accurate local illumination compensation model to determine the adjustments to the slope and offset parameters of the model.

At block 710, the process 700 involves encoding the adjustments to the parameters of the local illumination compensation model in a bitstream of the video. If the offset adjustment can be derived from the slope adjustment, the slope adjustment is encoded into the bitstream without the offset adjustment. Otherwise, both adjustments to the slope and the offset may be encoded into the bitstream according to the syntax representation shown in Table 1 and the signaling mechanism as described above.

Figure 8:
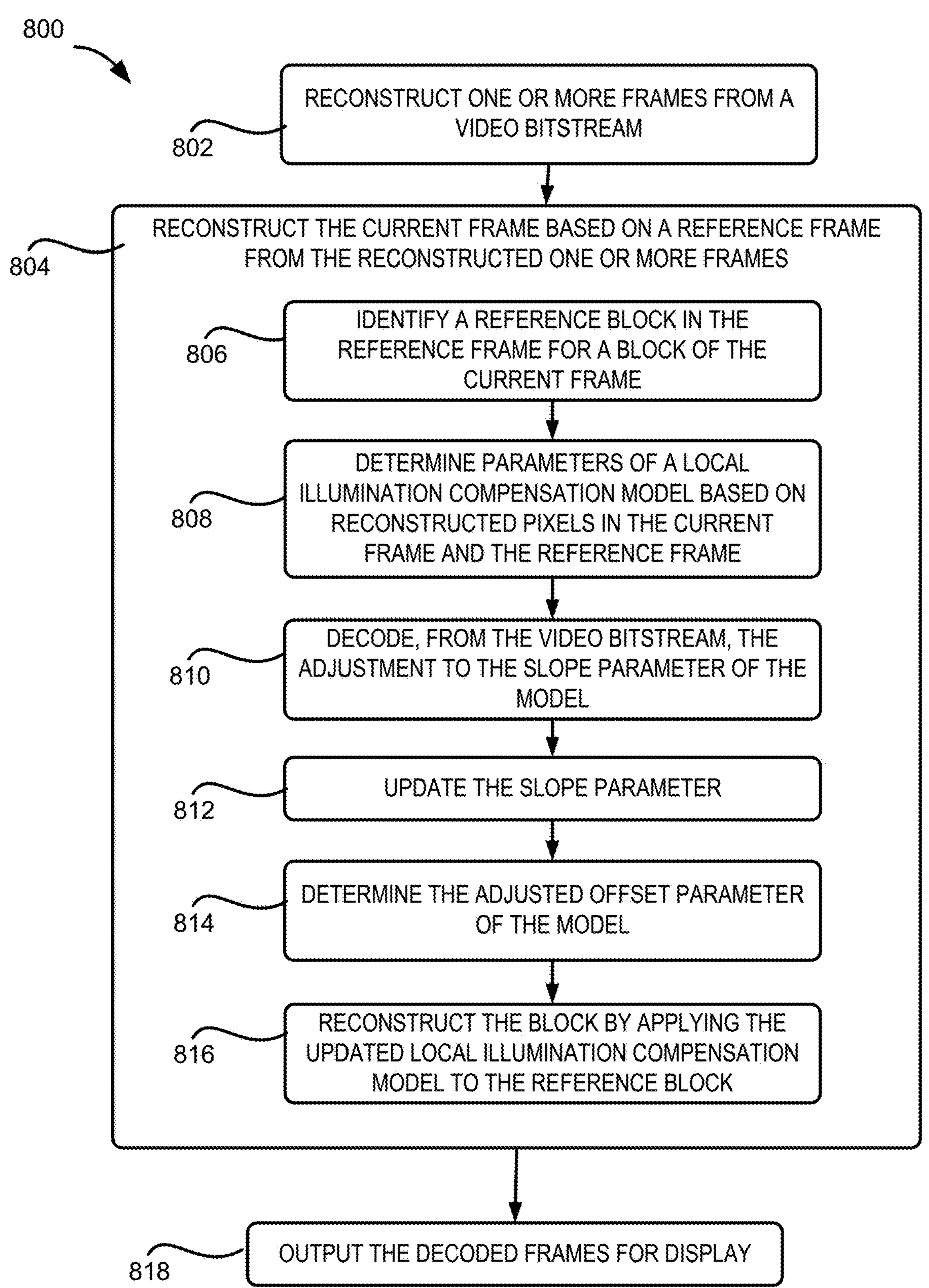
FIG. 8 depicts another example of a process for decoding an inter-predicted frame of a video that is encoded with local illumination compensation, according to some embodiments of the present disclosure.

FIG. 8 depicts an example of a process 800 for decoding an inter-predicted frame of a video that is encoded with local illumination compensation, according to some embodiments of the present disclosure. One or more computing devices implement operations depicted in FIG. 8 by executing suitable program code. For example, a computing device implementing the video decoder 200 may implement the operations depicted in FIG. 8 by executing the program code for the inter prediction module 224. For illustrative purposes, the process 800 is described with reference to some examples depicted in the figures. Other implementations, however, are possible.

At block 802, the process 800 involves reconstructing one or more frames of a video from a video bitstream representing the video, for example, using the decoding method described above with respect to FIG. 2. At block 804, which includes 806-818, the process 800 involves reconstructing a current frame based on a reference frame from the one or more reconstructed frames. At block 806, the process 800 involves identifying a reference block in the reference frame for a block of the current frame. The reference block can be identified based on the decoded motion vector associated with the block. In some examples, if the motion vector points to a block with sub-pixel positions in the reference frame, the sub-pixel positions may be rounded to the nearest integer pixel positions to identify the reference block.

At block 808, the process 800 involves determining parameters of a base local illumination compensation model using the reconstructed pixels in the current frame sand the reference frame. For example, as discussed above in detail with respect to FIG. 5, the parameters of a base local illumination compensation model can be determined via the least mean square (LMS) or similar method using the luma samples in the current block template 506 and the reference block template 516.

At block 810, the process 800 involves decoding, from the video bitstream, an adjustment to the slope parameter of the local illumination compensation model. At block 812, the process 800 involves updating the slope parameter of the model, for example, according to Eqn. (2) or Eqn. (4). At block 814, the process 800 involves determining the adjusted offset parameter of the local illumination compensation model. For example, if the offset adjustment is not transmitted in the video bitstream, the adjusted offset can be derived from the adjusted slope according to Eqn. (3) as discussed above. If the offset adjustment is encoded in the video bitstream, the offset adjustment can be decoded directly from the video bitstream, and the adjusted offset can be calculated according to Eqn. (5) as discussed above. At block 816, the process 800 involves reconstructing the block. The decoder can generate a prediction for the block by applying the updated local illumination compensation model to the reference block in the reference frame. The prediction can be used to reconstruct the block by combining with other data associated with the block, such as the predicted residual. The reconstructed block may also be used to perform intra- or inter-prediction for other blocks or pictures in the video by the decoder as described above with respect to FIGS. 1 and 2. At block 818, the reconstructed block may also be output for displaying along with other decoded blocks in the frame.

It should be understood that the examples described above are for illustration purposes and should not be construed as limiting. Different implementations may be employed to generate and update the local illumination compensation model. For example, instead of the L-shape template shown in FIG. 5, templates with other shapes may be used, such as a shape containing only left neighboring pixels or top neighboring pixels of the current block and the reference block. In a further example, multiple columns of left neighboring pixels and/or multiple rows of top neighboring pixels may be used as the template. Further, while the above description focusses on a linear function used for the local illumination compensation model, other types of functions may also be used. For example, a general higher polynomial function, such as a second-degree polynomial function can be used to model the illumination change.

Computing System Example

Figure 9:
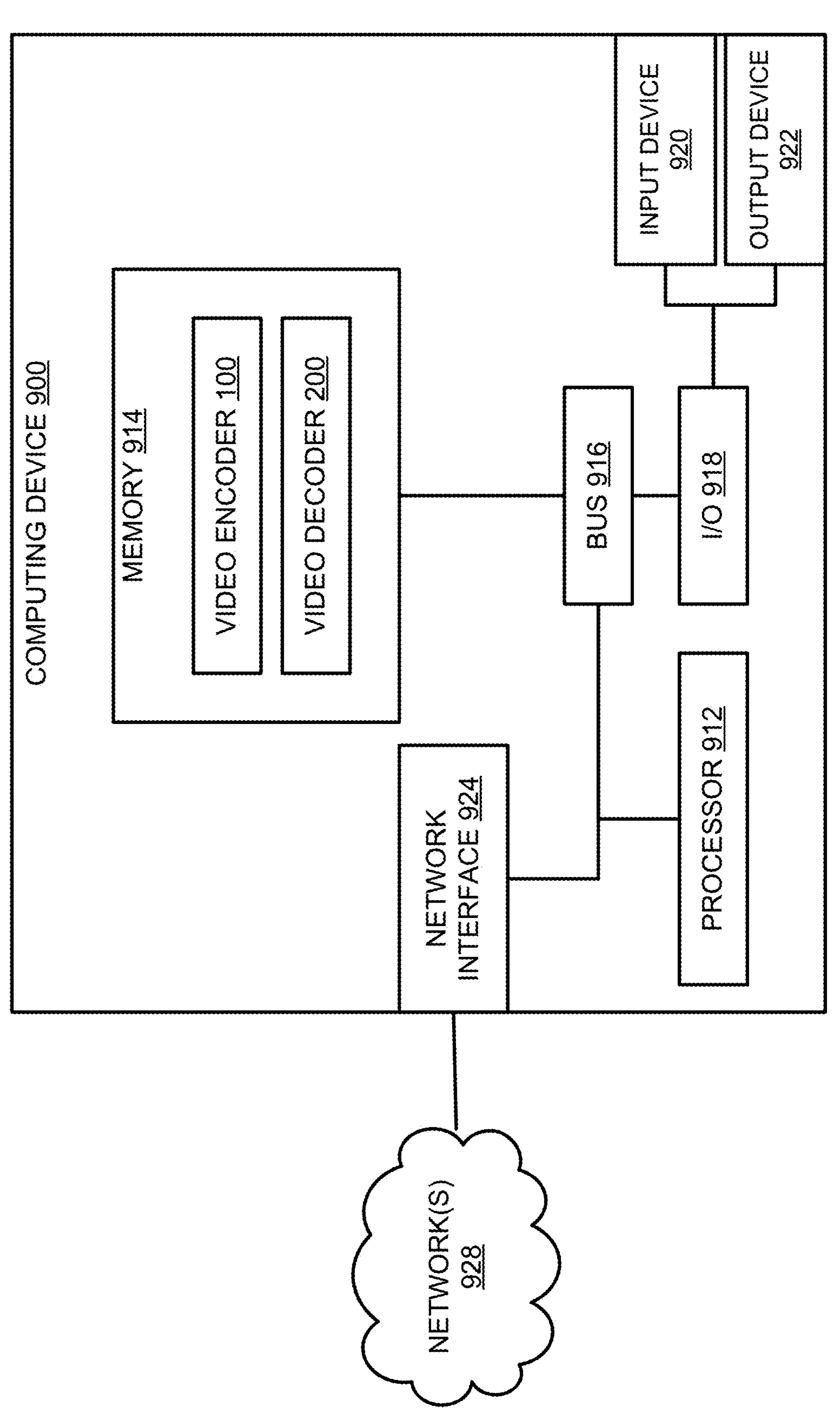
FIG. 9 depicts an example of a computing system that can be used to implement some embodiments of the present disclosure.

Any suitable computing system can be used for performing the operations described herein. For example, FIG. 9 depicts an example of a computing device 900 that can implement the video encoder 100 of FIG. 1 or the video decoder 200 of FIG. 2. In some embodiments, the computing device 900 can include a processor 912 that is communicatively coupled to a memory 914 and that executes computer-executable program code and/or accesses information stored in the memory 914. The processor 912 may comprise a microprocessor, an application-specific integrated circuit ("ASIC"), a state machine, or other processing device. The processor 912 can include any of a number of processing devices, including one. Such a processor can include or may be in communication with a computer-readable medium storing instructions that, when executed by the processor 912, cause the processor to perform the operations described herein.

The memory 914 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 900 can also include a bus 916. The bus 916 can communicatively couple one or more components of the computing device 900. The computing device 900 can also include a number of external or internal devices such as input or output devices. For example, the computing device 900 is shown with an input/output ("I/O") interface 918 that can receive input from one or more input devices 920 or provide output to one or more output devices 922. The one or more input devices 920 and one or more output devices 922 can be communicatively coupled to the I/O interface 918. The communicative coupling can be implemented via any suitable manner (e.g., a connection via a printed circuit board, connection via a cable, communication via wireless transmissions, etc.). Non-limiting examples of input devices 920 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 922 include an LCD screen, an external monitor, a speaker, or any other device that can be used to display or otherwise present outputs generated by a computing device.

The computing device 900 can execute program code that configures the processor 912 to perform one or more of the operations described above with respect to FIGS. 1-8. The program code can include the video encoder 100 or the video decoder 200. The program code may be resident in the memory 914 or any suitable computer-readable medium and may be executed by the processor 912 or any other suitable processor.

The computing device 900 can also include at least one network interface device 924. The network interface device 924 can include any device or group of devices suitable for establishing a wired or wireless data connection to one or more data networks 928. Non-limiting examples of the network interface device 924 include an Ethernet network adapter, a modem, and/or the like. The computing device 900 can transmit messages as electronic or optical signals via the network interface device 924.

GENERAL CONSIDERATIONS

Numerous details are set forth herein to provide a thorough understanding of the claimed subject matter. However, those skilled in the art will understand that the claimed subject matter may be practiced without these details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Some blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for decoding an inter-predicted frame of a video that is encoded with local illumination compensation, the method comprising:

reconstructing one or more frames of the video from a video bitstream representing the video;

reconstructing a current frame based on a reference frame from the reconstructed one or more frames, reconstructing the current frame comprising, for a block in the current frame:

identifying a reference block in the reference frame based on a motion vector associated with the block;

determining a first parameter and a second parameter of a local illumination compensation model based on a first set of reconstructed pixels in the current frame and a second set of reconstructed pixels in the reference frame;

decoding, from the video bitstream, a first adjustment to the first parameter and a flag indicating whether to apply an addition operation or a subtraction operation;

if the flag indicates that the addition operation is to be applied, adjusting the first parameter by applying the addition operation on the first adjustment and the first parameter; or if the flag indicates that the subtraction operation is to be applied, adjusting the first parameter by applying the subtraction operation on the first parameter and the first adjustment;

determining an adjusted second parameter; and reconstructing pixels of the block by applying, to the reference block, the local illumination compensation model with the adjusted first parameter and the adjusted second parameter; and causing the reconstructed one or more frames and the reconstructed current frame to be displayed.

2. The method of claim 1, wherein the local illumination compensation model is a linear model, the first parameter represents a slope, and the second parameter represents an offset.

3. The method of claim 2, further comprising:

calculating a representative average luma value from the reference frame or the current frame, wherein determining the adjusted second parameter comprises calculating the adjusted second parameter based on the adjusted first parameter, the second parameter, and the representative average luma value.

4. The method of claim 3, wherein the representative average luma value is one of an average value of reconstructed pixels of the reference block, an average value of the second set of reconstructed pixels in the reference frame, or an average value of the first set of reconstructed pixels in the current frame.

5. The method of claim 1, wherein determining the adjusted second parameter comprises:

extracting a second adjustment to the second parameter from the video bitstream; and determining the adjusted second parameter by applying the second adjustment to the second parameter.

6. The method of claim 1, further comprising:

encoding one or more syntax elements into the video bitstream representing the first adjustment to the first parameter in the video bitstream.

7. The method of claim 1, wherein the first set of reconstructed pixels in the current frame comprise one or more of reconstructed pixels above the block in the current frame or reconstructed pixels left of the block in the current frame, and the second set of reconstructed pixels in the reference frame comprise one or more of reconstructed pixels above the reference block in the reference frame or reconstructed pixels left of the reference block in the reference frame.

8. A non-transitory computer-readable medium having program code that is stored thereon, the program code executable by one or more processing devices for performing operations comprising:

reconstructing one or more frames of a video from a video bitstream representing the video;

reconstructing a current frame based on a reference frame from the reconstructed one or more frames, reconstructing the current frame comprising, for a block in the current frame:

identifying a reference block in the reference frame based on a motion vector associated with the block;

determining a first parameter and a second parameter of a local illumination compensation model based on a first set of reconstructed pixels in the current frame and a second set of reconstructed pixels in the reference frame;

decoding, from the video bitstream, a first adjustment to the first parameter and a flag indicating whether to apply an addition operation or a subtraction operation;

if the flag indicates that the addition operation is to be applied, adjusting the first parameter by applying the addition operation on the first adjustment and the first parameter; or if the flag indicates that the subtraction operation is to be applied, adjusting the first parameter by applying the subtraction operation on the first parameter and the first adjustment;

determining an adjusted second parameter; and reconstructing pixels of the block by applying, to the reference block, the local illumination compensation model with the adjusted first parameter and the adjusted second parameter; and causing the reconstructed one or more frames and the reconstructed current frame to be displayed.

9. The non-transitory computer-readable medium of claim 8, wherein the local illumination compensation model is a linear model, the first parameter represents a slope, and the second parameter represents an offset.

10. The non-transitory computer-readable medium of claim 9, wherein the operations further comprises calculating a representative average luma value from the reference frame or the current frame, wherein determining the adjusted second parameter comprises calculating the adjusted second parameter based on the adjusted first parameter, the second parameter, and the representative average luma value.

11. The non-transitory computer-readable medium of claim 10, wherein the representative average luma value is one of an average value of reconstructed pixels of the reference block, an average value of the second set of reconstructed pixels in the reference frame, or an average value of the first set of reconstructed pixels in the current frame.

12. The non-transitory computer-readable medium of claim 8, wherein determining the adjusted second parameter comprises:

extracting a second adjustment to the second parameter from the video bitstream; and determining the adjusted second parameter by applying the second adjustment to the second parameter.

13. The non-transitory computer-readable medium of claim 8, wherein the operations further comprises:

encoding one or more syntax elements into the video bitstream representing the first adjustment to the first parameter in the video bitstream.

14. The non-transitory computer-readable medium of claim 8, wherein the first set of reconstructed pixels in the current frame comprise one or more of reconstructed pixels above the block in the current frame or reconstructed pixels left of the block in the current frame, and the second set of reconstructed pixels in the reference frame comprise one or more of reconstructed pixels above the reference block in the reference frame or reconstructed pixels left of the reference block in the reference frame.

15. A method for inter predicting a frame of a video with local illumination compensation, the method comprising:

accessing a plurality of frames of the video;

performing inter prediction for a current frame in the plurality of frames, performing the inter prediction comprising, for a block in the current frame:

determining a first parameter and a second parameter of a local illumination compensation model based on a first set of reconstructed pixels in the current frame and a second set of reconstructed pixels in a reference frame in the plurality of frames, and determining a first adjustment to the first parameter based, at least in part, upon the first parameter, the second parameter, original pixels in the block and reconstructed pixels in a reference block in the reference frame, the reference block associated with the block via a motion vector calculated for the block; and encoding at least the first adjustment to the first parameter into a bitstream representing the video and encoding a flag indicating whether to apply an addition operation or a subtraction operation, wherein if the flag indicates that the addition operation is to be applied, the first adjustment is used in the addition operation to be applied on the first adjustment and the first parameter to adjust the first parameter; or wherein if the flag indicates that the subtraction operation is to be applied, the first adjustment is used in the subtraction operation to be applied on the first adjustment and the first parameter to adjust the first parameter.

16. The method of claim 15, wherein the local illumination compensation model is a linear model, the first parameter represents a slope of the linear model, and the second parameter represents an offset of the linear model.

17. The method of claim 16, wherein the first adjustment to the first parameter is further determined based on a representative average luma value determined from the reference frame or the current frame and wherein determining the first adjustment to the first parameter comprises:

for each candidate adjustment in a list of candidate adjustments, adjusting the first parameter by applying the candidate adjustment to the first parameter, adjusting the second parameter by modifying the second parameter based on the adjusted first parameter and the representative average luma value, calculating predicted pixels for the block by applying the local illumination compensation model with the adjusted first parameter and the adjusted second parameter on the reconstructed pixels in the reference block, and determining a distortion between the predicted pixels and the original pixels in the block; and determining the first adjustment to the first parameter as a candidate adjustment in the list of candidate adjustments that has a smallest distortion.

18. The method of claim 17, wherein the distortion is one of a sum of absolute transform distortion (SATD), a sum of absolute distortion (SAD), or a mean squared error (MSE).

19. The method of claim 17, wherein the representative average luma value is one of an average value of the reconstructed pixels of the reference block, an average value of the second set of reconstructed pixels in the reference frame, or an average value of the first set of reconstructed pixels in the current frame.

20. The method of claim 15, further comprising:

determining a second adjustment to the second parameter based, at least in part, upon the first parameter, the second parameter, the original pixels in the block and the reconstructed pixels in the reference block; and encoding the second adjustment to the second parameter into the bitstream representing the video.

* * * * *